US009959364B2

(12) United States Patent
Jain et al.

(10) Patent No.: US 9,959,364 B2
(45) Date of Patent: May 1, 2018

(54) CONTENT RECOMMENDATIONS

(71) Applicant: Yahoo!, Inc., Sunnyvale, CA (US)

(72) Inventors: Vidit Jain, Bangalore (IN); Abhranil Chatterjee, Bangalore (IN)

(73) Assignee: OATH INC., New York, NY (US)

( * ) Notice: Subject to any disclaimer, the term of this patent is extended or adjusted under 35 U.S.C. 154(b) by 895 days.

(21) Appl. No.: 14/284,647

(22) Filed: May 22, 2014

(65) Prior Publication Data

US 2015/0339381 A1 Nov. 26, 2015

(51) Int. Cl.
*G06F 17/30* (2006.01)

(52) U.S. Cl.
CPC .............. *G06F 17/30958* (2013.01)

(58) Field of Classification Search
CPC ......... G06F 17/30601; G06F 17/30713; G06F 17/30722; G06F 17/3089; G06F 17/30731; G06F 17/30734; G06F 17/3064; G06F 17/30672; G06F 17/30412; G06F 17/30598; G06F 17/30958; G06F 17/30643; G06F 17/30867; G06F 17/30705
See application file for complete search history.

(56) References Cited

U.S. PATENT DOCUMENTS

| | | | | |
|---|---|---|---|---|
| 8,131,702 B1 * | 3/2012 | Bharat | ............... | G06F 17/3071 707/706 |
| 8,805,845 B1 * | 8/2014 | Li | ................... | G06F 17/30958 707/738 |
| 9,367,541 B1 * | 6/2016 | Servan | ................ | G06F 17/278 |
| 9,529,890 B2 * | 12/2016 | Tee | ........................ | H04L 41/065 |
| 9,569,696 B1 * | 2/2017 | Osindero | ................ | G06K 9/66 |
| 9,607,074 B2 * | 3/2017 | Tee | .................... | G06F 17/30598 |
| 9,607,075 B2 * | 3/2017 | Tee | .................... | G06F 17/30598 |
| 9,633,103 B2 * | 4/2017 | Subramanya | ..... | G06F 17/30598 |
| 2003/0033288 A1 * | 2/2003 | Shanahan | ........... | G06F 17/3064 707/999.003 |
| 2003/0217052 A1 * | 11/2003 | Rubenczyk | ....... | G06F 17/30643 707/999.003 |

(Continued)

OTHER PUBLICATIONS

Coifman, et al., "Diffusion wavelets", In Applied and Computational Harmonic Analysis, 21 (1): pp. 53-94, 2006. 2, 3, http://www.sciencedirect.com/science/article/pii/S106352030600056X.

*Primary Examiner* — Ashish K Thomas
*Assistant Examiner* — Rezwanul Mahmood
(74) *Attorney, Agent, or Firm* — Cooper Legal Group, LLC

(57) ABSTRACT

Users consume a wide variety of content from various sources, such as videos accessible through websites. As provided herein, content recommendations that are contextually and/or semantically relevant to current content consumed by a user may be identified and provided to the user. For example, metadata for a video being watched by the user may be identified (e.g., terms extracted from a description, user reviews, a category, and/or other information). The metadata may be used to identify content recommendations based upon the metadata corresponding to terms grouped into a set of refined topic groupings of a graph comprising terms and relationships between terms extracted from a content corpus. The metadata may be matched to relevant terms within the set of refined topic groupings, and content recommendations comprising content corresponding to the relevant terms may be suggested to the user.

20 Claims, 14 Drawing Sheets

(56) References Cited

U.S. PATENT DOCUMENTS

| | | | | |
|---|---|---|---|---|
| 2007/0033221 A1* | 2/2007 | Copperman | G06F 17/30616 | 707/999.103 |
| 2007/0203924 A1* | 8/2007 | Guha | G06F 17/30716 | 707/999.1 |
| 2007/0214133 A1* | 9/2007 | Liberty | G06F 17/3064 | |
| 2009/0132236 A1* | 5/2009 | Kislyuk | G06F 17/3087 | 704/9 |
| 2009/0132953 A1* | 5/2009 | Reed, Jr. | G06F 3/0481 | 715/781 |
| 2009/0319288 A1* | 12/2009 | Slaney | G06Q 10/10 | 705/1.1 |
| 2009/0327259 A1* | 12/2009 | Smith | G06F 17/30713 | 707/999.005 |
| 2010/0079458 A1* | 4/2010 | Koehler | G06T 11/206 | 345/440 |
| 2010/0082694 A1* | 4/2010 | Corsi | G06F 17/30958 | 707/798 |
| 2010/0082752 A1* | 4/2010 | Donato | G06F 17/30861 | 709/206 |
| 2011/0040552 A1* | 2/2011 | Van Guilder | G06F 17/246 | 704/4 |
| 2012/0245927 A1* | 9/2012 | Bondy | G10L 21/0232 | 704/203 |
| 2013/0238608 A1* | 9/2013 | Sia | G06F 17/30675 | 707/723 |
| 2014/0108322 A1* | 4/2014 | Buchanan | G06N 5/02 | 706/50 |
| 2014/0172914 A1* | 6/2014 | Elnikety | G06F 17/30958 | 707/774 |
| 2014/0195984 A1* | 7/2014 | Aslam | G06Q 50/265 | 715/853 |
| 2014/0325364 A1* | 10/2014 | Tee | H04L 41/065 | 715/736 |
| 2014/0365504 A1* | 12/2014 | Franceschini | G06F 17/30958 | 707/748 |
| 2014/0365584 A1* | 12/2014 | Abali | H04L 51/20 | 709/206 |
| 2015/0032707 A1* | 1/2015 | Barykin | G06F 17/30303 | 707/694 |
| 2015/0046492 A1* | 2/2015 | Balachandran | G06F 8/36 | 707/772 |
| 2015/0052098 A1* | 2/2015 | Kveton | G06F 17/30731 | 706/52 |
| 2015/0081725 A1* | 3/2015 | Ogawa | G06F 17/30595 | 707/754 |
| 2015/0089409 A1* | 3/2015 | Asseily | G06Q 10/10 | 715/765 |
| 2015/0095291 A1* | 4/2015 | Subramanya | G06Q 30/00 | 707/692 |
| 2015/0106157 A1* | 4/2015 | Chang | G06Q 30/0201 | 705/7.29 |
| 2015/0120713 A1* | 4/2015 | Kim | G06F 17/3053 | 707/723 |
| 2015/0120717 A1* | 4/2015 | Kim | G06F 17/30699 | 707/727 |
| 2015/0248476 A1* | 9/2015 | Weissinger | G06F 17/30516 | 707/737 |
| 2015/0269139 A1* | 9/2015 | McAteer | G06F 17/2785 | 704/9 |
| 2015/0310085 A1* | 10/2015 | Tee | G06F 17/30598 | 707/737 |
| 2015/0310086 A1* | 10/2015 | Tee | G06F 17/30598 | 707/737 |
| 2015/0339381 A1* | 11/2015 | Jain | G06F 17/30958 | 707/798 |
| 2016/0026918 A1* | 1/2016 | Barbieri | G06N 99/005 | 706/11 |
| 2016/0042051 A1* | 2/2016 | Tee | G06F 17/30598 | 707/692 |
| 2016/0063115 A1* | 3/2016 | Ayan | G06Q 50/01 | 707/722 |
| 2016/0070731 A1* | 3/2016 | Chang | G06Q 30/00 | 707/741 |
| 2016/0103932 A1* | 4/2016 | Sathish | G06F 3/048 | 715/767 |
| 2016/0140220 A1* | 5/2016 | Chaumartin | G06F 17/30707 | 707/740 |
| 2016/0147891 A1* | 5/2016 | Chhichhia | G06F 17/30011 | 707/734 |
| 2017/0039297 A1* | 2/2017 | Koutrika | G06F 17/21 | |
| 2017/0103119 A1* | 4/2017 | Tee | G06F 17/30598 | |
| 2017/0124184 A1* | 5/2017 | Podgorny | G06F 17/30696 | |

* cited by examiner

CONTENT RECOMMENDATIONS

BACKGROUND

Many users discover, explore, and/or interact with content through search interfaces. When a user of a computing device submits a search query through a search interface, the search query may be submitted to a search engine. A set of search results, relevant to the search query, may be received from the search engine. The set of search results may be presented through the search interface to the user. Selection of a search result causes the computing device to present a content item associated with the search result.

SUMMARY

In accordance with the present disclosure, a graph may be generated based upon terms and relationships between terms extracted from a content corpus. The graph may be decomposed into a set of topic groupings, where a topic grouping comprises one or more terms that contribute to a topic. The set of topic groupings are filtered based upon a topic contribution threshold to identify a set of refined topic groupings, where a refined topic grouping comprises one or more terms that contribute to a topic above the topic contribution threshold. Metadata of current content consumed by a user may be identified. The metadata may be projected into the set of refined topic groupings to identify a set of relevant nodes of the graph, where the set of relevant nodes correspond to a set of relevant terms that are contextually and/or semantically related to the metadata. One or more content recommendations are provided based upon content associated with the set of relevant nodes, such as video recommendations related to the set of relevant terms.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Presented Techniques

One or more techniques and/or systems for providing content recommendations are provided herein. For example, a user may be consuming current content (e.g., the user may watch a video provided through a website). Metadata of the current content may be identified, such as terms occurring within a title, a description, a category, a user review, etc. The metadata may be used to identify content recommendations that may be contextually and/or semantically similar to the current content. For example, a car review video recommendation and a car racing video recommendation may be identified and provided to a user based upon the user watching a car show video. As provided herein, identification of content recommendations may be improved by generating a graph of terms extracted from a content corpus. Diffusion wavelets may be constructed over the graph to decompose the graph into overlapping parts, such as topic groupings, that are semantically relevant groupings of terms about topics or concepts. Within a topic grouping, terms that have relatively low contribution to a topic may be filtered/removed so that the remaining terms have a relatively uniform and/or substantial contribution to the topic. In this way, a set of refined topic groupings for the graph may be identified. The metadata may be projected into the set of refined topic groups, such as a projection within Euclidean space using scaling functions derived from a multiscale harmonic analysis of the graph, to identify a set of relevant nodes of the graph (e.g., k-nearest neighboring nodes representing terms that may be contextually and semantically similar to terms of the metadata). Content recommendations may be provided based upon content associated with the set of relevant nodes (e.g., video recommendations comprising metadata corresponding to terms represented by the set of relevant nodes).

Figure 1:
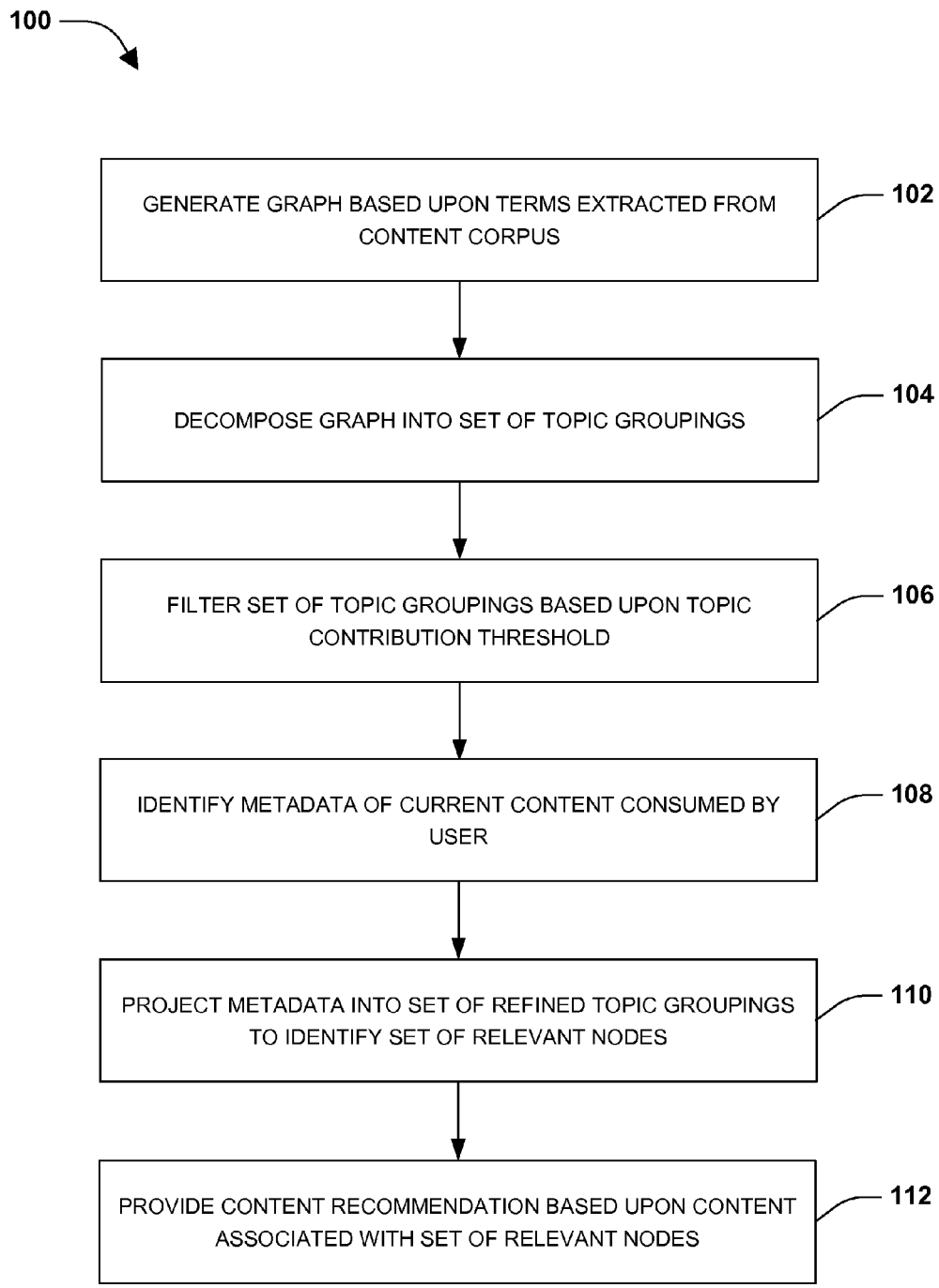
FIG. 1 is a flow chart illustrating an exemplary method of providing content recommendations.

An embodiment of providing content recommendations is illustrated by an exemplary method 100 of FIG. 1. A content corpus may comprise a plethora of content, such as videos. Terms, such as titles, descriptions, user reviews, categories, authors, actors, and/or other terminology, may be associated with the content within the content corpus. At 102, a graph may be generated based upon terms extracted from the content corpus. The graph may comprise one or more nodes connected by one or more edges. A node may represent a term, and an edge between two nodes may represent a relationship (e.g., a semantic similarity) between terms represented by the two nodes. For example, a first node may represent a term "pizza" and a second node may represent a term "soda", and an edge connecting the first node and the second node may represent a semantic similarity between the term "pizza" and the term "soda".

At 104, the graph may be decomposed into a set of topic groupings. A topic grouping comprises one or more terms that contribute to a topic of the topic grouping. For example, a food topic grouping may comprise the first node representing the term "pizza", the second node representing the term "soda", and/or other nodes representing terms contributing to a food topic. A sports topic grouping may comprise one or more nodes representing terms contributing to a sports topic. At 106, the set of topic groupings may be filtered based upon a topic contribution threshold to identify a set of refined topic groupings from the graph. The topic contribution threshold may specify a threshold amount of contribution a term is to provide to a topic (e.g., a threshold amount of semantic relevance of the term to the topic). In this way, terms that have relatively low contribution (e.g., relatively low semantic relevance) to a topic may be removed from a topic grouping.

In an example of filtering the set of topic groupings, one or more terms may be iteratively removed from a topic grouping based upon the topic contribution threshold. During a first iteration, weights may be assigned to respective terms within the topic grouping. The weights may be normalized (e.g., to 1) to define a probability mass function. An entropy of the probably mass function may be computed. Responsive to the entropy having a value that is not between a minimum entropy curve and a uniform probability distribution entropy curve, at least one term may be removed from the topic grouping based upon the topic contribution threshold. The value of the entropy may be reduced based upon the at least one removed term. In this way, one or more iterations may be performed to remove terms from the topic grouping until a current value of the entropy is between the minimum entropy curve and the uniform probability distribution entropy curve. The topic grouping may thus be refined into a refined topic grouping (e.g., that merely comprises remaining/un-removed terms), where the refined topic grouping is comprised within the set of refined topic groupings.

In another example of filtering the set of topic groupings, a diffusion wavelet tree construction technique may be utilized to identify the set of refined topic groupings. The diffusion wavelet tree construction technique may generate topics that have a tendency to have local support over a vocabulary of terms (e.g., terms extracted from the content corpus, and represented within the graph and/or the set of topic groupings). For example, one or more global supportive terms may be removed from a topic grouping (e.g., terms that provide relatively low contribution to a topic, such as a contribution less than the topic contribution threshold). One or more local supportive terms may be retained within the topic grouping (e.g., terms that provide relatively high contribution to the topic, such as a contribution greater than the topic contribution threshold). In this way the set of refined topic groups may be identified from the graph.

At 108, metadata of current content consumed by a user may be identified. For example, a user may be watching a cooking video. Metadata for the cooking video may comprise one or more terms extracted from a title, description, author, user review, category, and/or other information about the cooking video (e.g., "pepperoni", "bread", "chef", "baking", "wine", etc.). The one or more terms may comprise a non-entity term (e.g., "bread"), an adjective term (e.g., "hot"), an adverb term (e.g., "slowly"), a noun term (e.g., "wine"), a verb term (e.g., "baking"), an entity term (e.g., Chef Dan), etc.

At 110, the metadata may be projected into the set of refined topic groupings from the graph to identify a set of relevant nodes. The set of relevant nodes may represent terms that are semantically and/or contextually relevant/similar to the current content (e.g., the set of relevant nodes may comprise the first node representing the term "pizza" and the second node representing the term "soda" because such terms may be relevant to terms within the metadata of the cooking video, such as "bread", "pepperoni", and "wine"). In an example, a multiscale harmonic analysis of the graph may be performed to obtain a set of scaling functions. A scaling function may correspond to a topic of a refined topic grouping. A term may be extracted from the metadata, and the term may be projected into the set of refined topic groupings using the set of scaling functions to identify a relevant node for inclusion within the set of relevant nodes. For example, the metadata may be projected into a Euclidean space, within which the set of refined topic groupings is represented, using the set of scaling functions. A threshold number of neighboring nodes (e.g., a k nearest neighbors) within the Euclidean space may be identified for inclusion within the set of relevant nodes by utilizing a locality hashing technique (e.g., a fast locality sensitive hashing approach).

At 112, one or more content recommendations may be provided based upon content associated with the set of relevant nodes. For example, a pizza cooking video recommendation and/or a make your own soda video recommendation may be provided, such as after the user has completed watching the cooking video. In an example, the current content may comprise a first video, such as the cooking video, and a content recommendation may comprise a second video contextually and/or semantically relevant to the first video, such as a pizza making video. In an example, the current content may be associated a first language, and a content recommendation may be associated with content in a second language. In an example, the current content may be associated with an English language and/or a non-English language, and a content recommendation may be associated with content in the English language, the non-English language and/or a second non-English language. In this way, content recommendations that are contextually and/or semantically relevant to current content consumed by a user may be identified and/or suggested to the user.

Figure 2A:
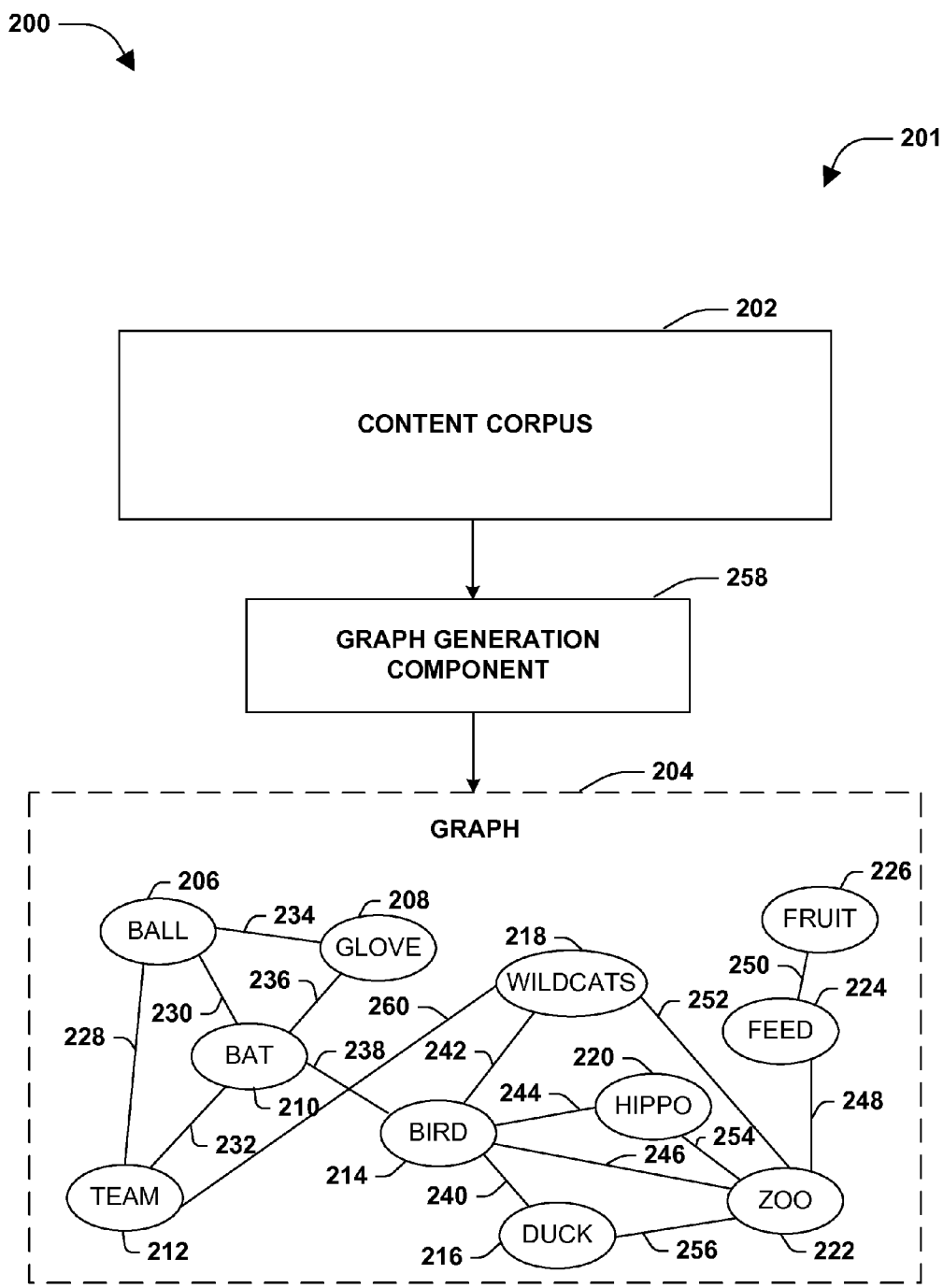
FIG. 2A is a component block diagram illustrating an exemplary system for identifying a set of refined topic groupings, where a graph is generated.
Figure 2B:
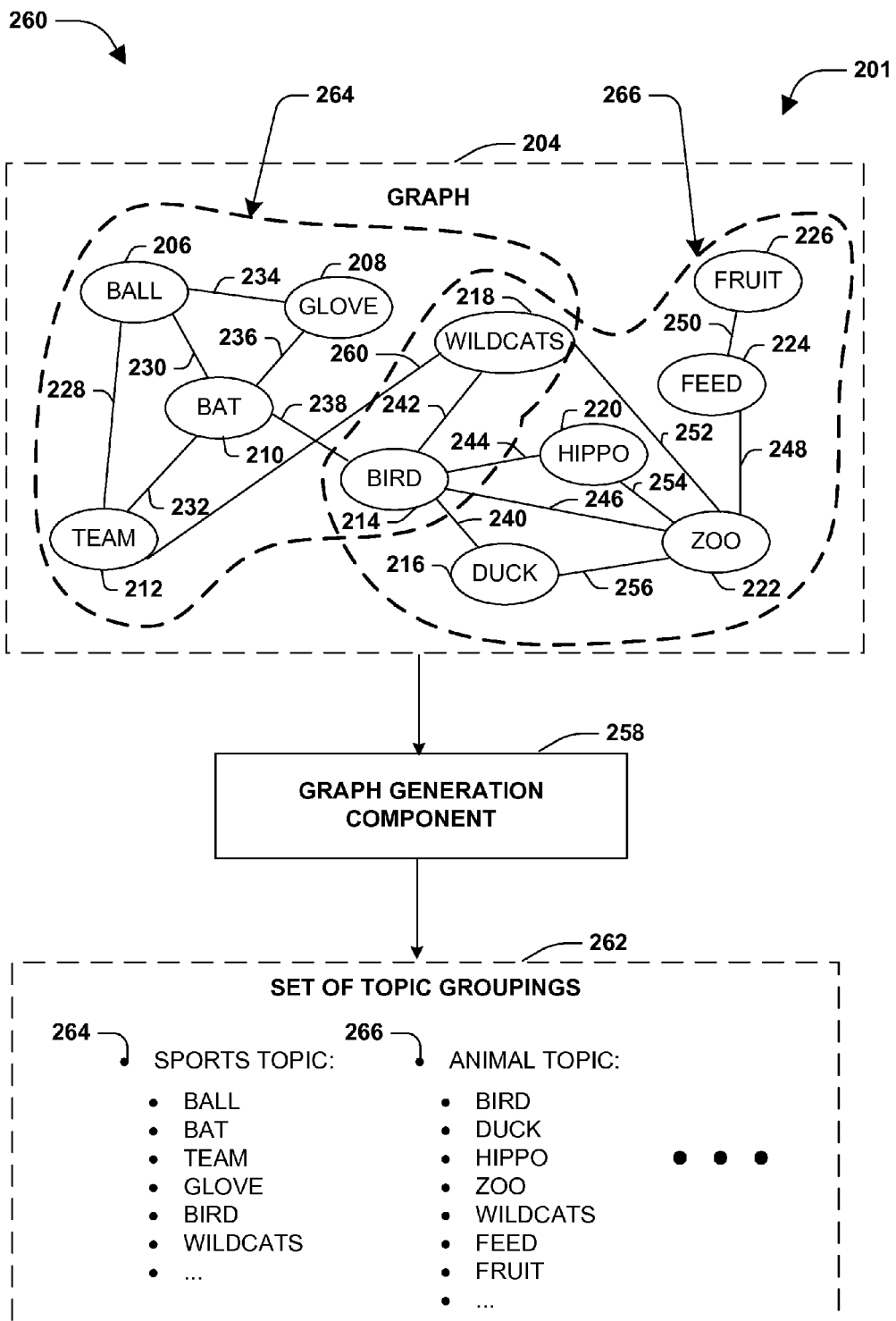
FIG. 2B is a component block diagram illustrating an exemplary system for identifying a set of refined topic groupings, where a set of topic groupings is identified.
Figure 2C:
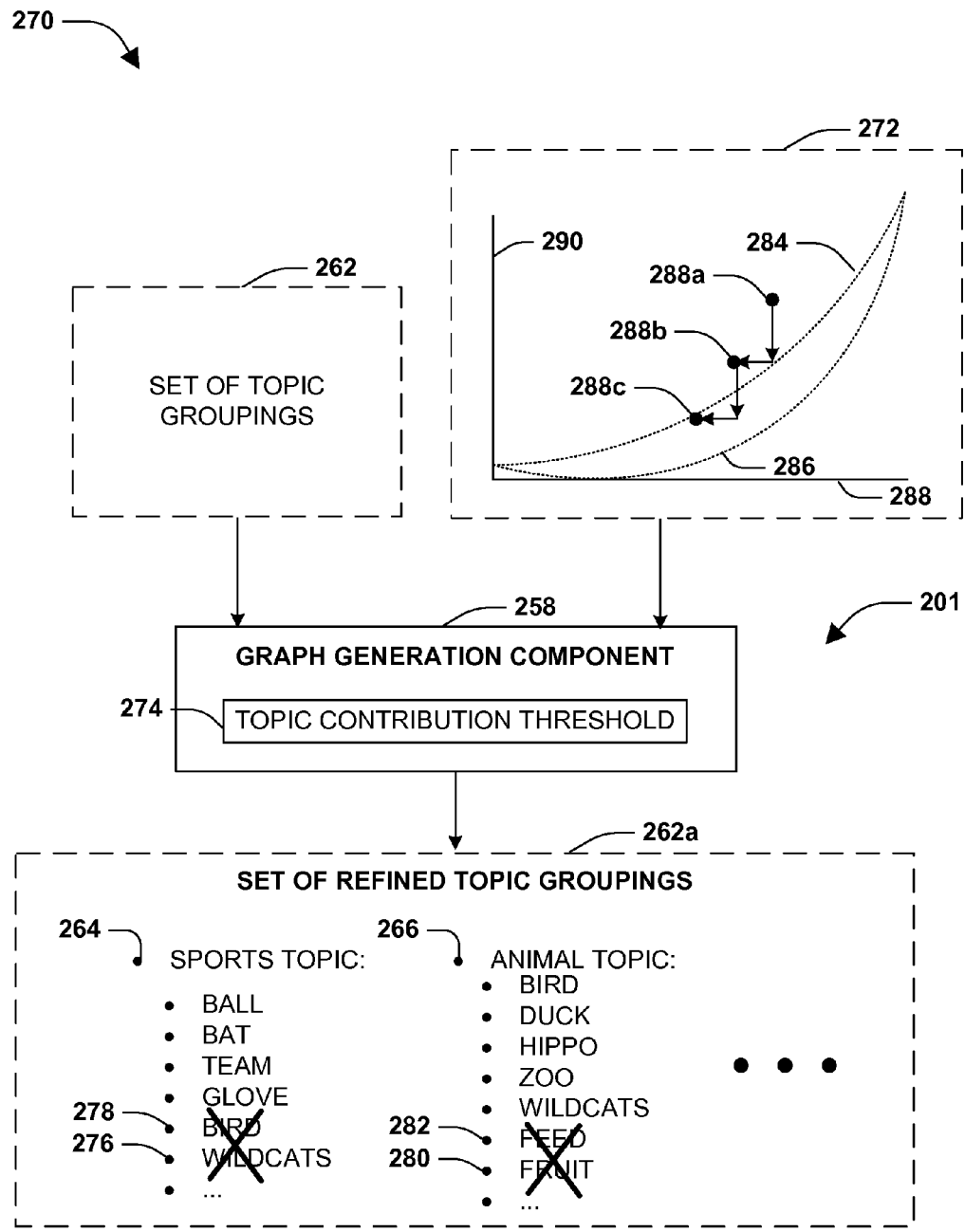
FIG. 2C is a component block diagram illustrating an exemplary system for identifying a set of refined topic groupings, where a set of refined topic groupings is identified.

FIGS. 2A-2C illustrates examples of a system 201 for identifying a set of refined topic groupings. FIG. 2A illustrates an example 200 of the system 201 comprising a graph generation component 258. The graph generation component 258 may be configured to identify terms and relationships between terms of a content corpus 202 to generate a graph 204. For example, the content corpus 202 may comprise videos associated with descriptive information (e.g., categories, authors, user reviews, descriptions, etc.). The graph generation component 258 may extract terms from the descriptive information. The graph generation component 258 may represent terms within the graph 204 as nodes. For example, a ball node 206 may represent a term "ball", a glove node 208 may represent a term "glove", a bat node 210 may represent a term "bat", a team node 212 may represent a term "team", a bird node 214 may represent a term "bird", a duck node 216 may represent a term "duck", a wildcats node 218 may represent a term "wildcats", a hippo node 220 may represent a term "hippo", a zoo node 222 may represent a term "zoo", a feed node 224 may represent a term "feed", a fruit node 226 may represent a term "fruit", and/or a plethora of other nodes may represent a wide variety of terms extracted from the content corpus 202.

Edges between nodes may represent relationships (e.g., contextual and/or semantic similarity) between terms represented by nodes. For example, a first edge 228 between the ball node 206 and the team node 212 may represent a relationship (e.g., an amount of similarity) between the term "ball" and the term "team". A second edge 230 between the ball node 206 and the bat node 210 may represent a relationship (e.g., an amount of similarity) between the term "ball" and the term "bat". In this way, edges, such as the first edge 228, the second edge 230, a third edge 232 between the team node 212 and the bat node 210, a fourth edge 234 between the ball node 206 and the glove node 208, a fifth edge 236 between the glove node 208 and the bat node 210, a sixth edge 238 between the bat node 210 and the bird node 214, a seventh edge 240 between the bird node 214 and the duck node 216, an eighth edge 242 between the bird node 214 and the wildcats node 218, a ninth edge 244 between the bird node 214 and the hippo node 220, a tenth edge 246 between the bird node 214 and the zoo node 222, an eleventh edge 248 between the feed node 224 and the zoo node 222, a twelfth edge 250 between the fruit node 226 and the feed node 224, a thirteenth edge 252 between the wildcats node 218 and the zoo node 222, a fourteenth edge 254 between the hippo node 220 and the zoo node 222, a fifteenth edge 256 between the duck node 216 and the zoo node 222, a sixteenth edge 260 between the team node 212 and the wildcats node 218 and/or other edges, may represent relationships between terms.

FIG. 2B illustrates an example 260 of decomposing the graph 204 into a set of topic groupings 262. For example, the graph generation component 258 may identify a sports topic grouping 264 corresponding to the term "ball" represented by the ball node 206, the term "bat" represented by the bat node 210, the term "team" represented by the team node 212, the term "glove" represented by the glove node 208, the term "bird" represented by the bird node 214, and the term "wildcats" represented by the wildcats node 218 based upon relationships represented by edges connecting such nodes. The graph generation component 258 may identify an animal topic grouping 266 corresponding to the term "bird" represented by the bird node 214, the term "fruit" represented by the fruit node 226, the term "duck" represented by the duck node 216, the term "hippo" represented by the hippo node 220, the term "zoo" represented by the zoo node 222, the term "wildcats" represented by the wildcats nodes 218, and the term "feed" represented by the feed node 224 based upon relationships represented by edges connecting such nodes. In this way, the set of topic groupings 262 may be identified, where a topic grouping comprises an overlapping portion of the graph 204 that represents a semantically relevant grouping of terms about a semantic topic/concept.

FIG. 2C illustrates an example 270 of filtering the set of topic groupings 262 based upon a topic contribution threshold 274 to identify a set of refined topic groupings 262a. In an example, the graph generation component 258 may iteratively remove one or more terms from topic groupings based upon the topic contribution threshold 274. For example, an entropy analysis 272 may be performed to identify terms for removal, where an x-axis 288 represents entropy and a y-axis 290 represent a distribution length. A minimum entropy curve 284 and a uniform probability distribution entropy curve 286 may be specified for the entropy analysis 272.

In an example of filtering the sports topic grouping 264, a first entropy 288a may be computed based upon the sports topic grouping 264 (e.g., based upon a probability mass function derived from normalized weights assigned to terms within the sports topic grouping 264). Responsive to the first entropy 288a having a value that is not between the minimum entropy curve 284 and the uniform probability distribution entropy curve 286, one or more terms may be removed from the sports topic grouping 264, such as removal 276 of the term "wildcats", based upon the topic contribution threshold 274. The first entropy 288a may be reduced based upon the removal 276, resulting in a second entropy 288b. Responsive to the second entropy 288b having a value that is not between the minimum entropy curve 284 and the uniform probability distribution entropy curve 286, one or more terms may be removed from the sports topic grouping 264, such as removal 278 of the term "bird", based upon the topic contribution threshold 274. The second entropy 288b may be reduced based upon the removal 276, resulting in a third entropy 288c. Because the third entropy 288c has a value between the minimum entropy curve 284 and the uniform probability distribution entropy curve 286, a refined sports topic grouping is identified based upon the remaining terms. Similarly, one or more terms may be iteratively removed from the animal topic grouping 266, such as removal 280 of the term "fruit" and removal 282 of the term "feed", to create a refined animal topic grouping. In this way, the set of refined topic groupings 262a may be identified.

Figure 3A:
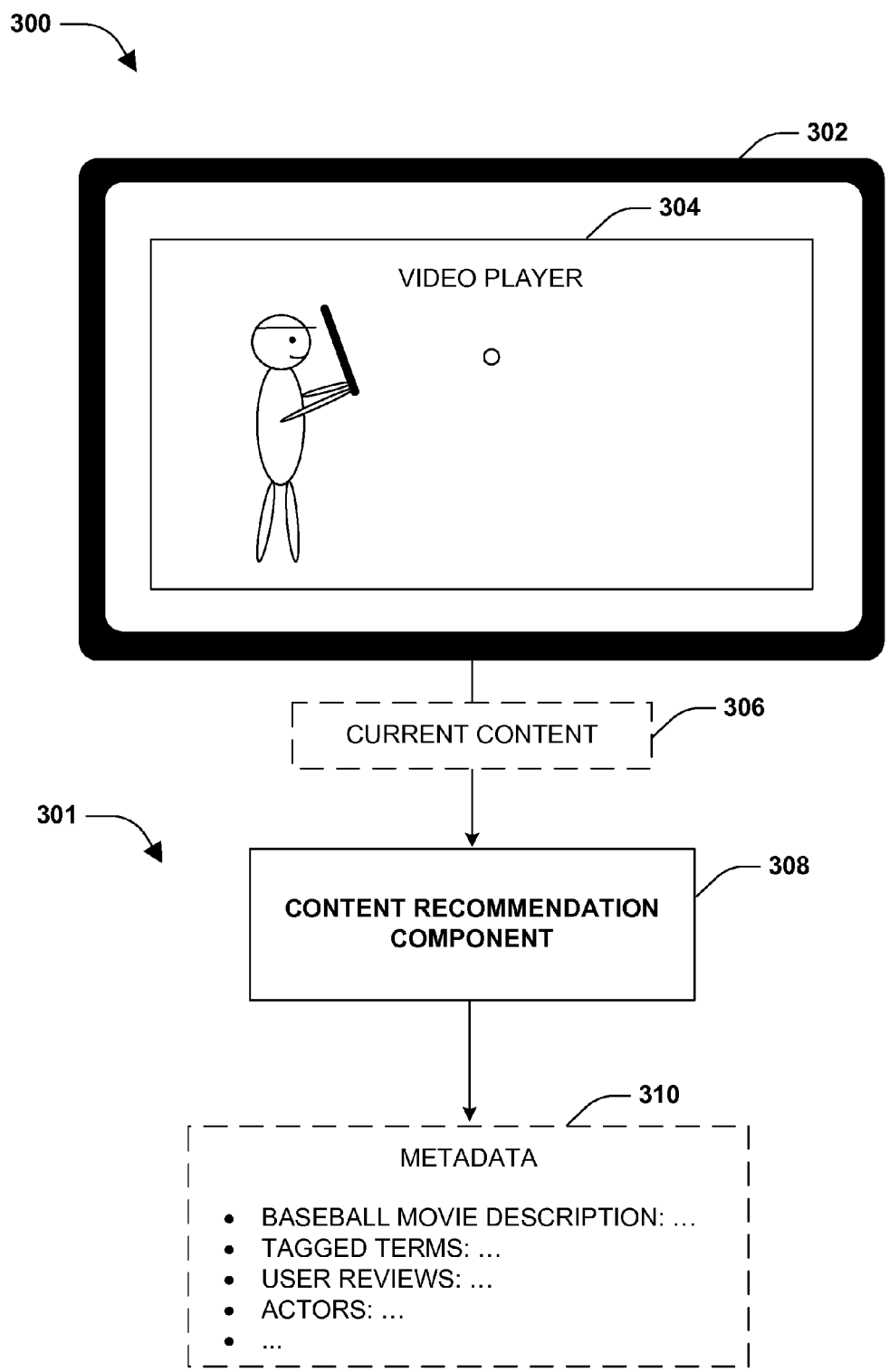
FIG. 3A is a component block diagram illustrating an exemplary system for providing content recommendations, where metadata of current content is identified.
Figure 3B:
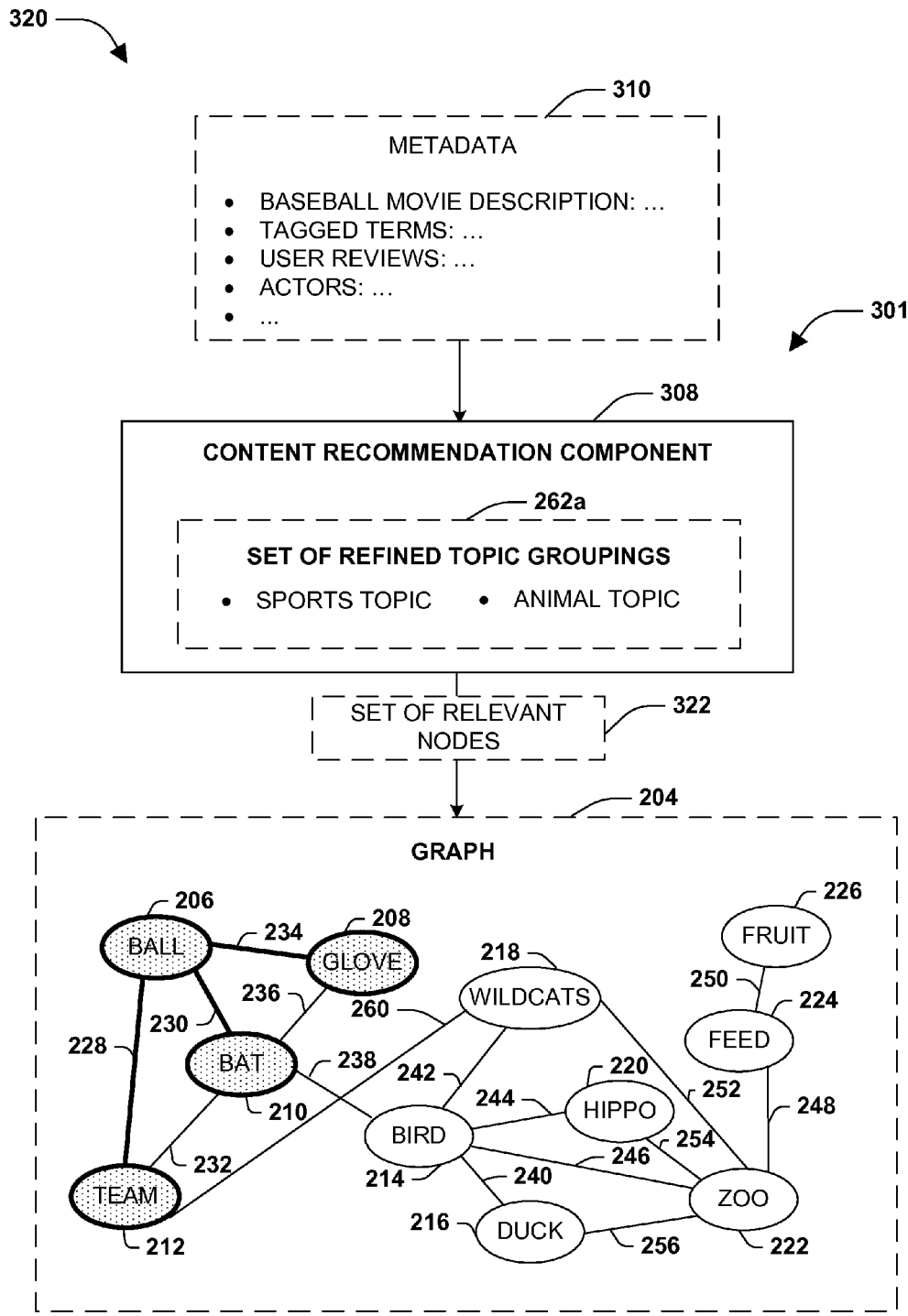
FIG. 3B is a component block diagram illustrating an exemplary system for providing content recommendations, where a set of relevant nodes is identified.
Figure 3C:
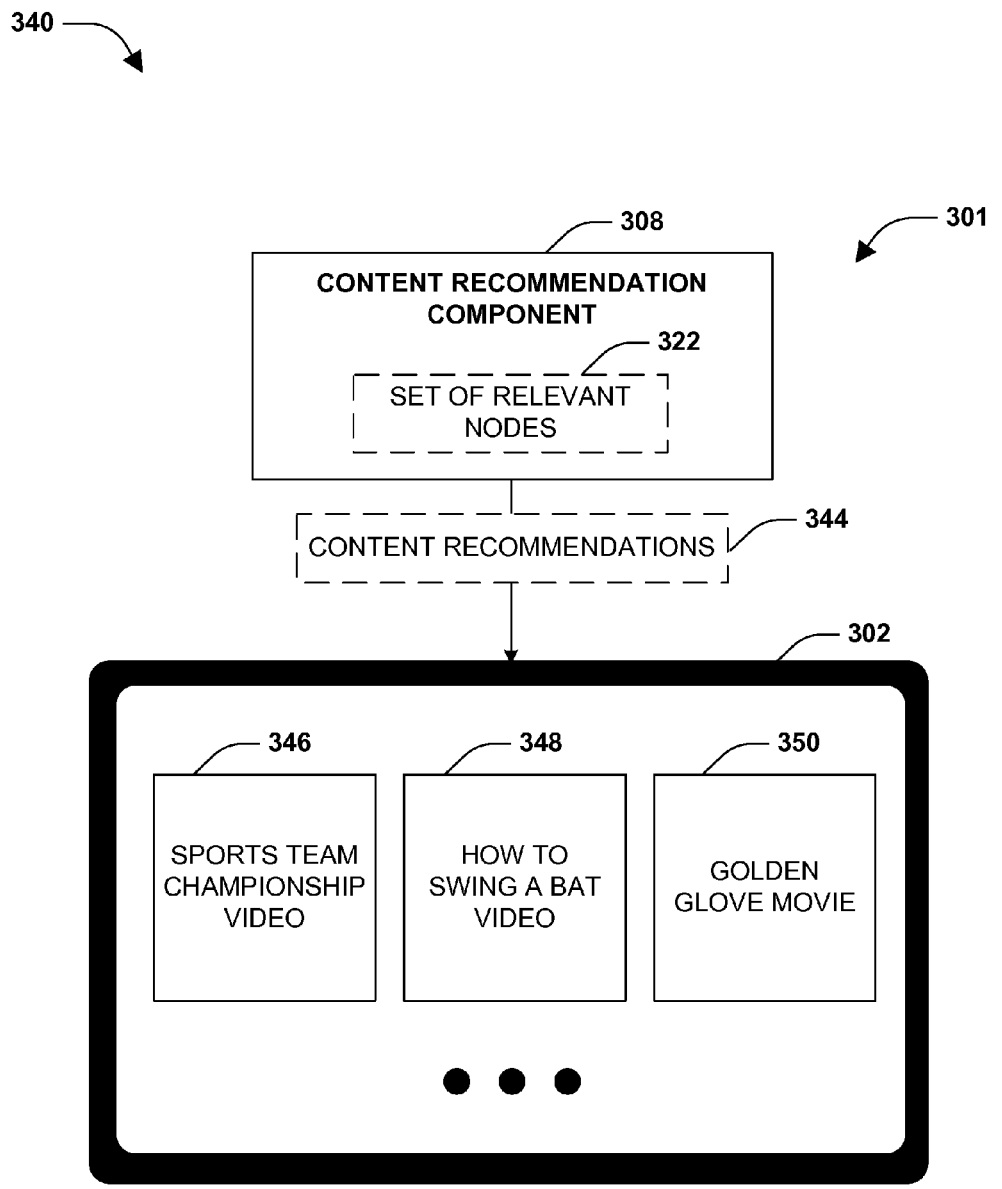
FIG. 3C is a component block diagram illustrating an exemplary system for providing content recommendations, where one or more content recommendations is provided.

FIGS. 3A-3C illustrate examples of a system 301 for providing content recommendations. FIG. 3A illustrates an example 300 of a content recommendation component 308 identifying current content 306 consumed by a user. For example, the current content 306 may comprise a baseball movie presented to the user through a video player 304 of a website accessed by a computing device 302. Metadata 310 of the current content 306 may be identified. The metadata 310 may comprise a description, tagged terms, user reviews, actors, a category, and/or a variety of other information about the baseball movie.

FIG. 3B illustrates an example 320 of the content recommendation component 308 projecting the metadata 310 into the set of refined topic groupings 262a to identify a set of relevant nodes 322 within the graph 204. For example, a set of scaling functions, corresponding to topics of the set of refined topic groupings 262a (e.g., a sports topic for the refined sports topic grouping, an animal topic for the refined animal topic grouping, etc.), may be used to project terms within the metadata 310 into a Euclidean space within which the set of refined topic groupings 262a is represented. In an example, the set of relevant nodes 322 may comprise a threshold number of neighboring nodes within the Euclidean space, such as the ball node 206, the bat node 210, the glove node 208, and the team node 212 (e.g., 4 nodes representing terms that may be semantically and/or contextually relevant/similar to terms within the metadata 310).

FIG. 3C illustrates an example 340 of the content recommendation component 308 providing content recommendations 344 based upon content associated with the set of relevant nodes 322. For example, a sports team championship video recommendation 346, a how to swing a bat video recommendation 348, and a golden glove movie recommendation 350 may be provided through the website accessed by the computing device 302 (e.g., during and/or after the user has watched the baseball movie) because such content may be associated with terms represented by the set of relevant nodes 322 (e.g., the term "ball" represented by the ball node 206, the term "glove" represented by the glove node 208, the term "bat" represented by the bat node 210, and the term "team" represented by the team node 212). In this way, content recommendations that are contextually and/or semantically relevant/similar to current content consumed by users may be presented.

Figure 4A:
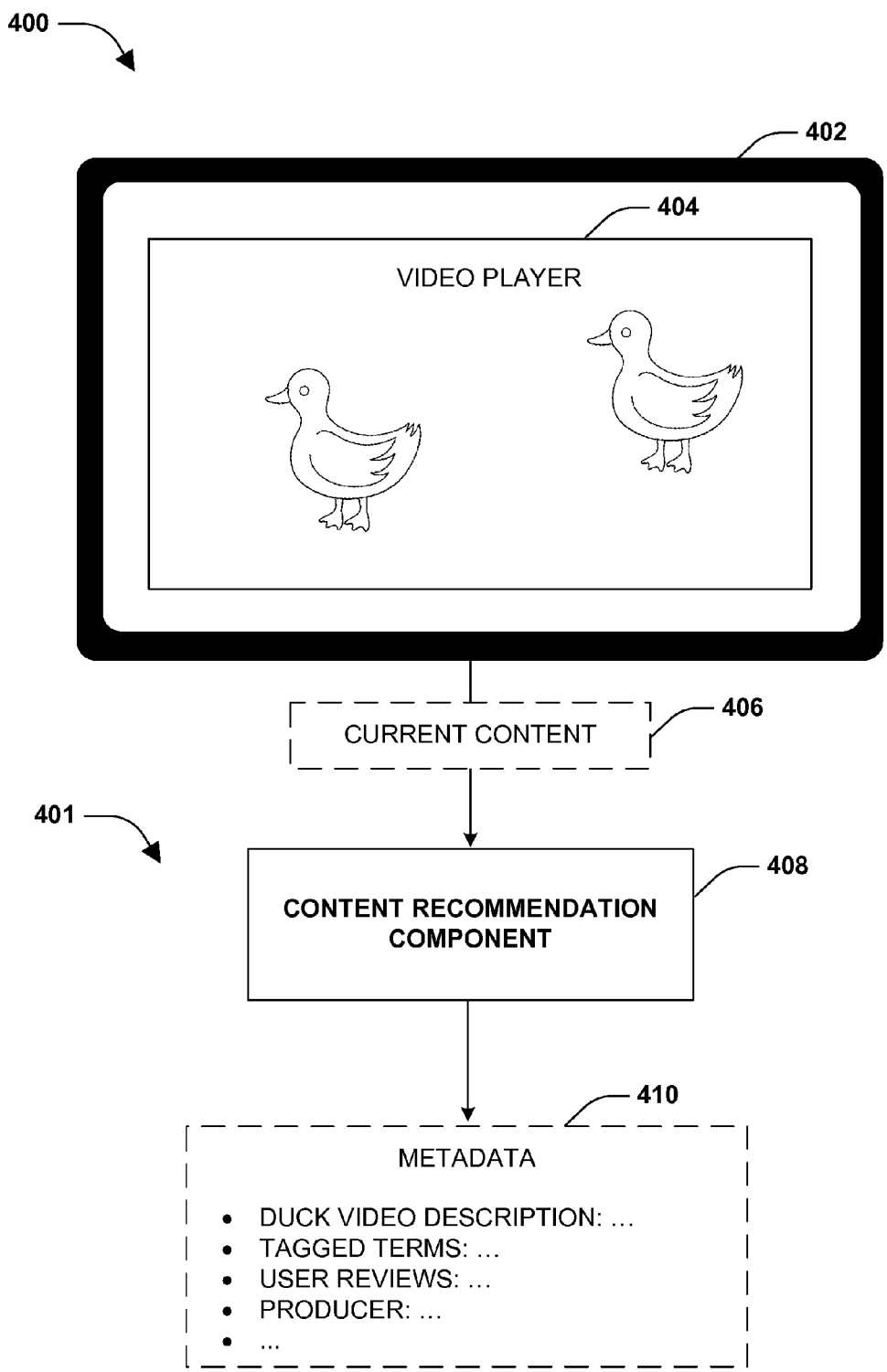
FIG. 4A is a component block diagram illustrating an exemplary system for providing content recommendations, where metadata of current content is identified.
Figure 4B:
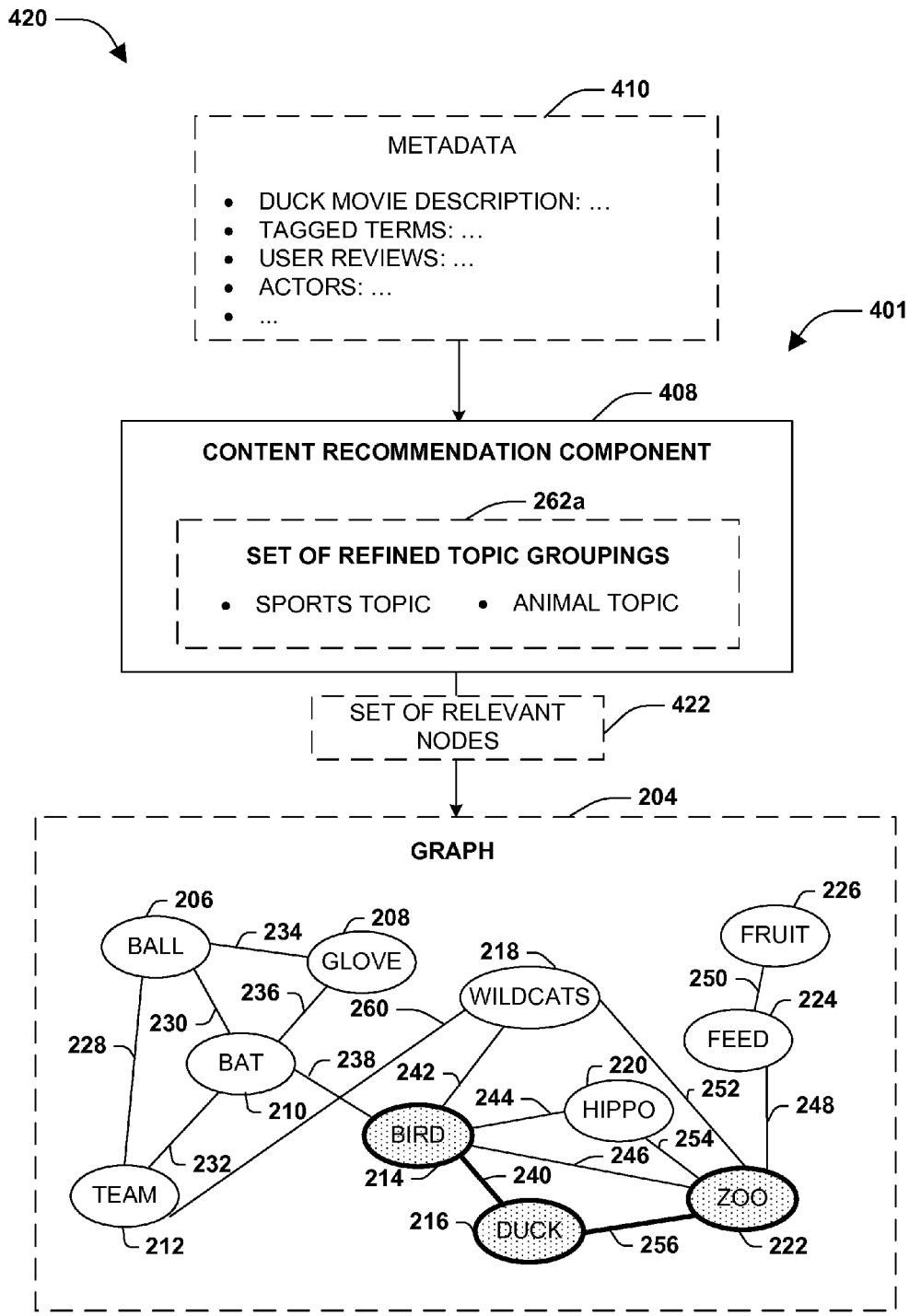
FIG. 4B is a component block diagram illustrating an exemplary system for providing content recommendations, where a set of relevant nodes is identified.
Figure 4C:
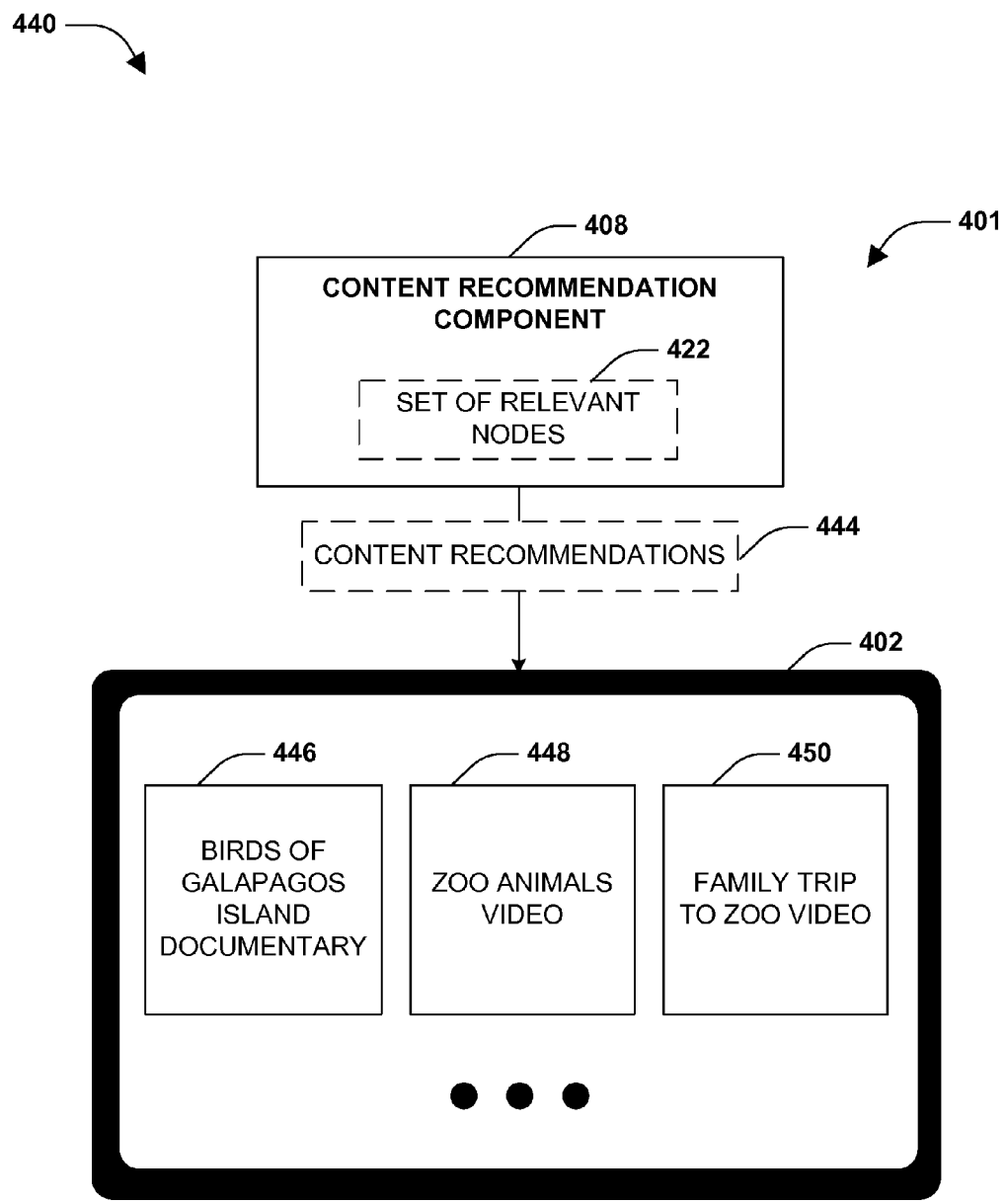
FIG. 4C is a component block diagram illustrating an exemplary system for providing content recommendations, where one or more content recommendations is provided.

FIGS. 4A-4C illustrate examples of a system 401 for providing content recommendations. FIG. 4A illustrates an example 400 of a content recommendation component 408 identifying current content 406 consumed by a user. For example, the current content 406 may comprise a duck video presented to the user through a video player 404 of a website accessed by a computing device 402. Metadata 410 of the current content 406 may be identified. The metadata 410 may comprise a description, tagged terms, user reviews, producers, a category, and/or a variety of other information about the duck movie.

FIG. 4B illustrates an example 420 of the content recommendation component 408 projecting the metadata 410 into the set of refined topic groupings 262a to identify a set of relevant nodes 422 within the graph 204. For example, a set of scaling functions, corresponding to topics of the set of refined topic groupings 262a (e.g., a sports topic for the refined sports topic grouping, an animal topic for the refined animal topic grouping, etc.), may be used to project terms within the metadata 410 into a Euclidean space within which the set of refined topic groupings 262a is represented. In an example, the set of relevant nodes 422 may comprise a threshold number of neighboring nodes within the Euclidean space, such as the bird node 214, the duck node 216, and the zoo node 222 (e.g., 3 nodes representing terms that may be semantically and/or contextually relevant/similar to terms within the metadata 410).

FIG. 4C illustrates an example 440 of the content recommendation component 408 providing content recommendations 444 based upon content associated with the set of relevant nodes 422. For example, a birds of Galapagos island documentary recommendation 446, a zoo animals video recommendation 448, and a family trip to zoo recommendation 450 may be provided through the website accessed by the computing device 402 (e.g., during and/or after the user has watched the duck video) because such content may be associated with terms represented by the set of relevant nodes 422 (e.g., the term "bird" represented by the bird node 214, the term "duck" represented by the duck node 216, the term "zoo" represented by the zoo node 222). In this way, content recommendations that may be contextually and/or semantically relevant/similar to current content consumed by users may be presented.

2. Computing Scenario

The following provides a discussion of some types of computing scenarios in which the disclosed subject matter may be utilized and/or implemented.

2.1. Networking

Figure 5:
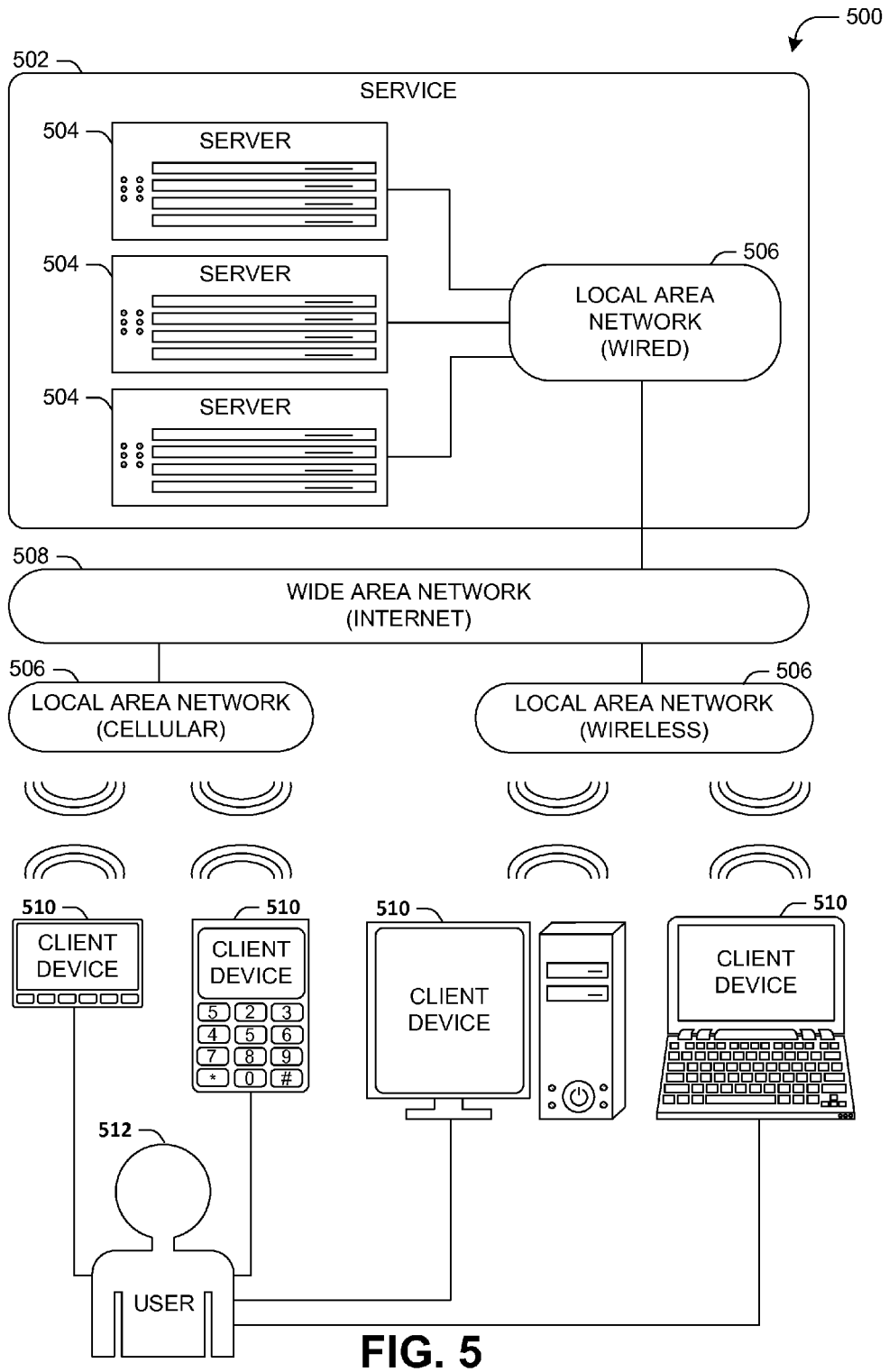
FIG. 5 is an illustration of a scenario involving various examples of networks that may connect servers and clients.

FIG. 5 is an interaction diagram of a scenario 500 illustrating a service 502 provided by a set of servers 504 to a set of client devices 510 via various types of networks. The servers 504 and/or client devices 510 may be capable of transmitting, receiving, processing, and/or storing many types of signals, such as in memory as physical memory states.

The servers 504 of the service 502 may be internally connected via a local area network 506 (LAN), such as a wired network where network adapters on the respective servers 504 are interconnected via cables (e.g., coaxial and/or fiber optic cabling), and may be connected in various topologies (e.g., buses, token rings, meshes, and/or trees). The servers 504 may be interconnected directly, or through one or more other networking devices, such as routers, switches, and/or repeaters. The servers 504 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 506 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 506 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 502.

Likewise, the local area network 506 may comprise one or more sub-networks, such as may employ differing architectures, may be compliant or compatible with differing protocols and/or may interoperate within the local area network 506. Additionally, a variety of local area networks 506 may be interconnected; e.g., a router may provide a link between otherwise separate and independent local area networks 506.

Likewise, the local area network 506 may comprise one or more sub-networks, such as may employ differing architectures, may be compliant or compatible with differing protocols and/or may interoperate within the local area network 506. Additionally, a variety of local area networks 506 may be interconnected; e.g., a router may provide a link between otherwise separate and independent local area networks 506.

In the scenario 500 of FIG. 5, the service 502 may be accessed via the wide area network 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various connections to the wide area network 508. As a first such example, one or more client devices 510 may comprise a cellular communicator and may communicate with the service 502 by connecting to the wide area network 508 via a wireless local area network 506 provided by a cellular provider. As a second such example, one or more client devices 510 may communicate with the service 502 by connecting to the wide area network 508 via a wireless local area network 506 provided by a location such as the user's home or workplace (e.g., a WiFi network or a Bluetooth personal area network). In this manner, the servers 504 and the client devices 510 may communicate over various types of networks. Other types of networks that may be accessed by the servers 504 and/or client devices 510 include mass storage, such as network attached storage (NAS), a storage area network (SAN), or other forms of computer or machine readable media.

2.2. Server Configuration

Figure 6:
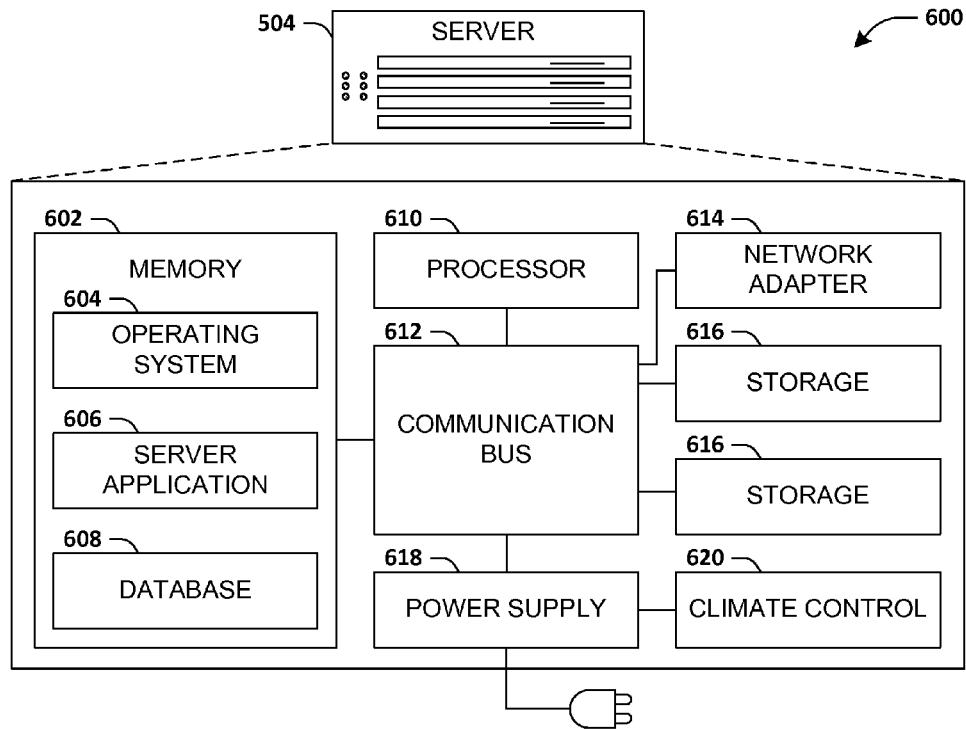
FIG. 6 is an illustration of a scenario involving an exemplary configuration of a server that may utilize and/or implement at least a portion of the techniques presented herein.

FIG. 6 presents a schematic architecture diagram 600 of a server 504 that may utilize at least a portion of the techniques provided herein. Such a server 504 may vary widely in configuration or capabilities, alone or in conjunction with other servers, in order to provide a service such as the service 502.

The server 504 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The server 504 may comprise memory 602 storing various forms of applications, such as an operating system 604; one or more server applications 606, such as a hypertext transport protocol (HTTP) server, a file transfer protocol (FTP) server, or a simple mail transport protocol (SMTP) server; and/or various forms of data, such as a database 608 or a file system. The server 504 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The server 504 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the server 504 with at least one other server. Other components that may optionally be included with the server 504 (though not shown in the schematic diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the server 504 to a state of readiness.

The server 504 may operate in various physical enclosures, such as a desktop or tower, and/or may be integrated with a display as an "all-in-one" device. The server 504 may be mounted horizontally and/or in a cabinet or rack, and/or may simply comprise an interconnected set of components. The server 504 may comprise a dedicated and/or shared power supply 618 that supplies and/or regulates power for the other components. The server 504 may provide power to and/or receive power from another server and/or other devices. The server 504 may comprise a shared and/or dedicated climate control unit 620 that regulates climate properties, such as temperature, humidity, and/or airflow. Many such servers 504 may be configured and/or adapted to utilize at least a portion of the techniques presented herein.

2.3. Client Device Configuration

Figure 7:
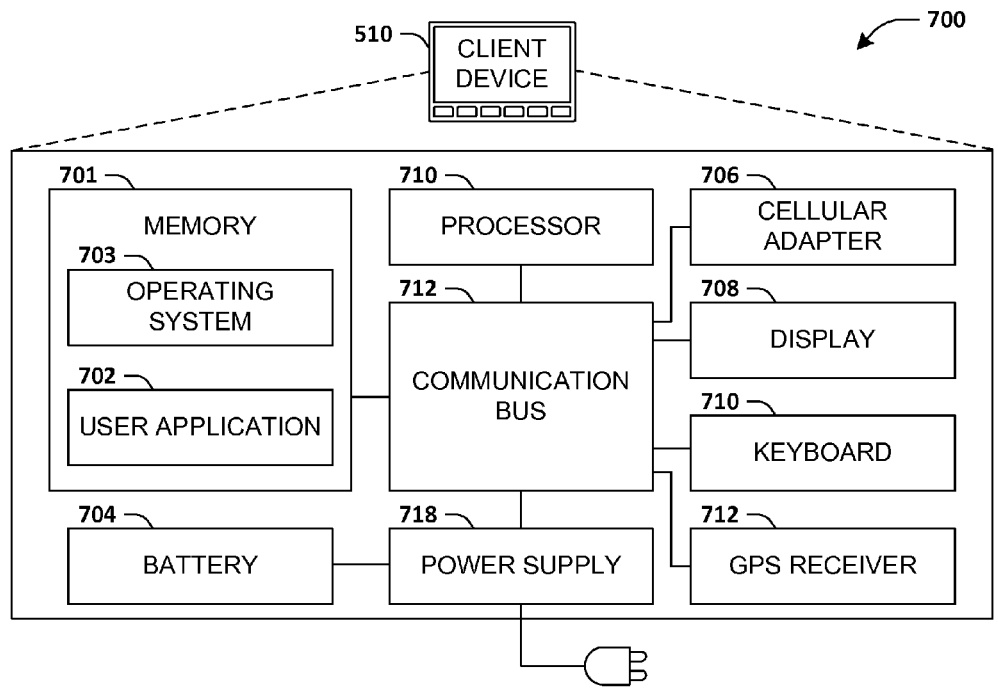
FIG. 7 is an illustration of a scenario involving an exemplary configuration of a client that may utilize and/or implement at least a portion of the techniques presented herein.

FIG. 7 presents a schematic architecture diagram 700 of a client device 510 whereupon at least a portion of the techniques presented herein may be implemented. Such a client device 510 may vary widely in configuration or capabilities, in order to provide a variety of functionality to a user such as the user 512. The client device 510 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 510 may serve the user in a variety of roles, such as a workstation, kiosk, media player, gaming device, and/or appliance.

The client device 510 may comprise one or more processors 710 that process instructions. The one or more processors 610 may optionally include a plurality of cores; one or more coprocessors, such as a mathematics coprocessor or an integrated graphical processing unit (GPU); and/or one or more layers of local cache memory. The client device 510 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 510 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 710, a mouse, a microphone, a camera, and/or a touch-sensitive component of the display 708; and/or environmental sensors, such as a global positioning system (GPS) receiver 712 that detects the location, velocity, and/or acceleration of the client device 510, a compass, accelerometer, and/or gyroscope that detects a physical orientation of the client device 510. Other components that may optionally be included with the client device 510 (though not shown in the schematic diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 510 to a state of readiness; and a climate control unit that regulates climate properties, such as temperature, humidity, and airflow.

The client device 510 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 510 may comprise a dedicated and/or shared power supply 718 that supplies and/or regulates power for other components, and/or a battery 704 that stores power for use while the client device 510 is not connected to a power source via the power supply 718. The client device 510 may provide power to and/or receive power from other client devices.

In some scenarios, as a user 512 interacts with a software application on a client device 510 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 510 may include one or more servers that may locally serve the client device 510 and/or other client devices of the user 512 and/or other individuals. For example, a locally installed webserver may provide web content in response to locally submitted web requests. Many such client devices 510 may be configured and/or adapted to utilize at least a portion of the techniques presented herein.

2.4. Search Engine and Service

Figure 8:
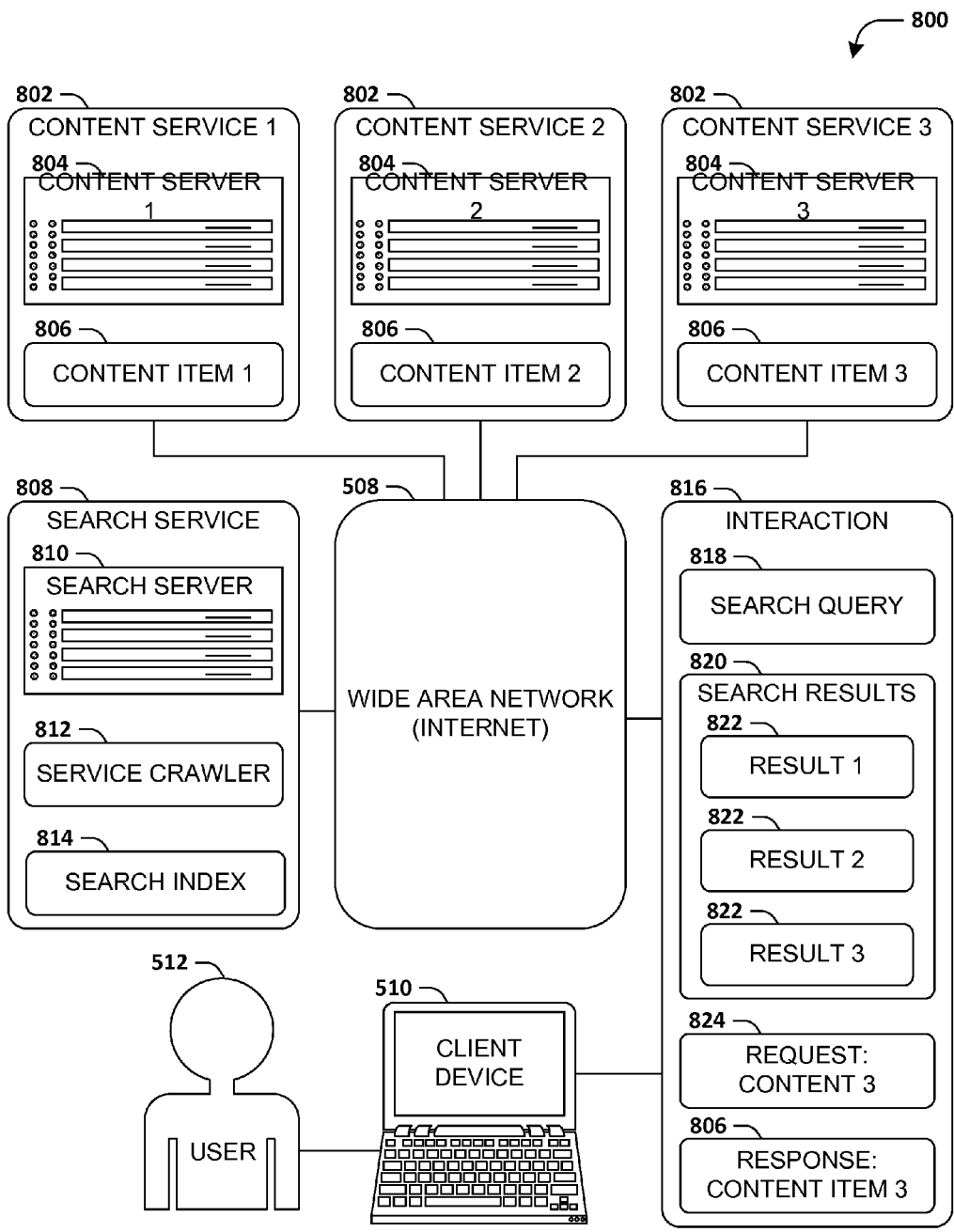
FIG. 8 is an illustration of a scenario involving an exemplary search service that may utilize and/or implement at least a portion of the techniques presented herein.

FIG. 8 is an interaction diagram of a scenario 800 a search engine and/or service that provides search results in response to a search query 818 on behalf of a user 512 and/or a client device 510. In this scenario 800, a set of content services 802 respectively comprise a content server 804 that provides access to a set of content items 806, such as text articles, pictures, video, audio, applications, data files, and/ or output from devices such as cameras. A search service 808 is provided, comprising a search server 810 that interacts with the content services 802 over the wide area network 508, such as the Internet, to index the content items 806 provided thereby. For example, the search server 810 may utilize a service crawler 812 that iteratively explores the content services 802 and generates a search index 814 correlating the content items 806 of respective services 802 with various aspects, such as the name, logical address, object type, involved topics, and/or the producer and/or owner of the content item 806. The search service 808 may be deployed in a distributed manner across at least two search servers, which may be organized by role (e.g., a first search server maintaining the search index 814, and a second search server interacting with users and/or client devices) and/or geographically (e.g., various search servers may be provided to service client devices in different physical locations). Components may be duplicated within the search service 808; e.g., two or more search servers may be provided to facilitate the reliability, response time, and/or scalability of the search service 808.

As further illustrated in the scenario 800 of FIG. 8, the user 512 of the client device 510 may engage in an interaction 816 with the search service 808 and/or content services 802 in the following manner. The user 512 may submit the search query 818, such as a set of search terms, to the search service 808. The search server 810 may compare the search query 818 with the search index 814 to identify a search result set 820, comprising one or more search results 822 that respectively identify a content item 806 stored by a content service 802. The search service 808 may send the search result set 820 back to the client device 510 in fulfillment of the search query 818, and the client device 510 may present the search result set 820 to the user 512. The search results 822 of the search result set 820 may also be sorted and/or ranked by relevance to the search query 818, by chronology, and/or by content service 802. If the user 512 selects a search result 822, the client device 510 may submit a request 824 for the content item 806 associated with the selected search result 822 to the consent service 802 storing the content item 806. The content server 804 may provide the content item 806 in response to the request 824, and the client device 510 may then present the selected content item 806 to the user 512. The search service 808 may also utilize other techniques and/or components, such as an index storage component, a search component, a ranking component, a cache, a profile storage component, a logon component, a profile builder, and one or more application program interfaces (APIs). Many such search services 808 may be provided, and may variously utilize the techniques presented herein.

In techniques such as those presented herein, search services 808 may index content provided by the same search service 808 (e.g., a search service 808 for a locally stored file system, database, or content library); for content stored by other content services 802; and/or for content stored by one or more client devices 510 (e.g., a cloud indexing service that indicates the availability of data objects on a distributed set of client devices 510 of the user 512). Additionally, such search services 808 may index a variety of content, including messages generated by and/or sent to the user 512; text articles; fiction and/or nonfiction stories; facts about topics such as individuals, companies, places; pictures; audio and video recordings; applications; data objects such as files and databases; and/or products and/or services.

Search services 808 may receive and process many types of search queries 818 specified in a variety of modalities, including text, handwriting, speech, verbal cues or keywords, gestures, and/or body language. The search queries 818 may also be specified in a variety of organizational formats, such as a group of keywords, a Boolean logical structure or expression tree, or a natural-language speech. Additionally, the search service 808 may return search results 822 that correlate with content items 806 in various ways, such as a hyperlink to a uniform resource identifier (URI) of the content item 806; a description of the content item 806, such as a title, file type, generation date, synopsis, and/or preview version of the content item 806; and/or a copy of the full content item 806.

Figure 9:
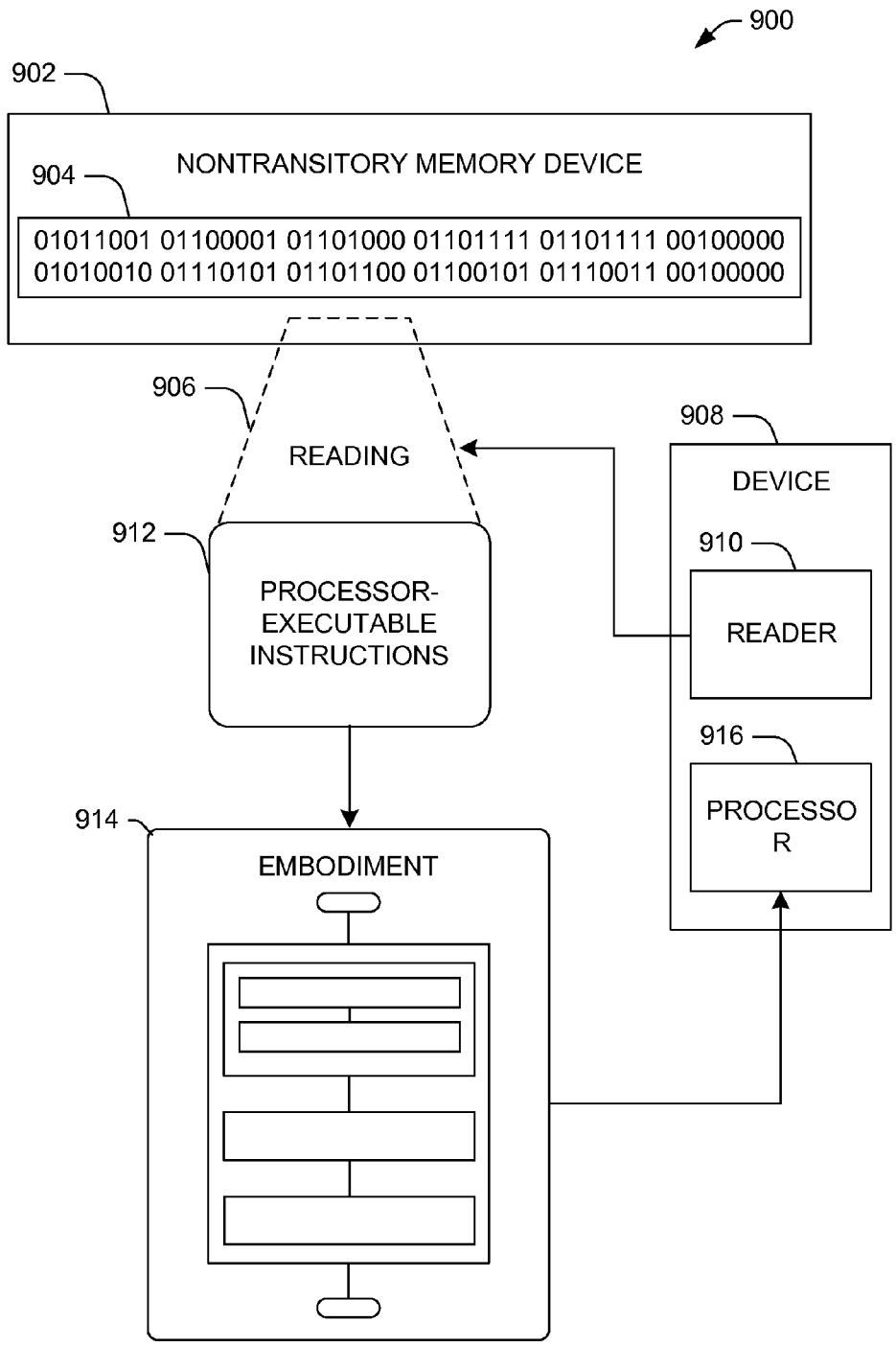
FIG. 9 is an illustration of a scenario featuring an exemplary nontransitory memory device in accordance with one or more of the provisions set forth herein.

FIG. 9 is an illustration of a scenario 900 involving an exemplary nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The exemplary nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the exemplary method 100 of FIG. 1, for example. In some embodiments, the processor-executable instructions, when executed on the processor 916 of the device 908, are configured to implement a system, such as at least some of the exemplary system 201 of FIGS. 2A-2c, at least some of the exemplary system 301 of FIGS. 3A-3C, and/or at least some of the exemplary system 401 of FIGS. 4A-4C, for example.

6. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for providing content recommendations, comprising:

generating a graph based upon terms extracted from a content corpus, the graph comprising one or more nodes connected by one or more edges, a first edge connecting a first node and a second node, the first node representing a first term, the second node representing a second term, and the first edge representing a relationship between the first term and the second term;

decomposing the graph into a set of topic groupings, a topic grouping comprising one or more terms that contribute to a topic of the topic grouping;

filtering the set of topic groupings based upon a topic contribution threshold, specifying a threshold amount of contribution a term is to provide to an associated topic, to identify a set of refined topic groupings from the graph, the filtering comprising:

assigning weights to respective terms within the topic grouping;

normalizing the weights to define a probability mass function;

computing an entropy of the probability mass function;

responsive to the entropy having a value that is not between a minimum entropy curve and a uniform probability distribution entropy curve, removing a third term from the topic grouping based upon the topic contribution threshold; and removing a fourth term from the topic grouping responsive to determining that the fourth term provides a first amount of contribution, less than the threshold amount of contribution, to the topic;

identifying metadata of current content consumed by a user;

projecting the metadata into the set of refined topic groupings within the graph to identify a set of relevant nodes; and providing one or more content recommendations based upon content associated with the set of relevant nodes.

2. The method of claim 1, the filtering the set of topic groupings comprising:
performing a multiscale harmonic analysis of the graph to obtain a set of scaling functions, a scaling function corresponding to a topic of a refined topic grouping.

3. The method of claim 2, the projecting comprising:
extracting a term from the metadata; and
projecting the term into the set of refined topic groupings using the set of scaling functions to identify a relevant node.

4. The method of claim 2, the projecting comprising:
projecting the metadata into a Euclidean space, within which the set of refined topic groupings is represented, using the set of scaling functions.

5. The method of claim 4, the projecting comprising:
identifying a threshold number of neighboring nodes within the Euclidean space, for inclusion within the set of relevant nodes, utilizing a locality hashing technique.

6. The method of claim 1, the identifying metadata comprising:
identifying at least one of a non-entity term, an adjective term, an adverb term, a noun term, a verb term, an entity term, or a term from the metadata.

7. The method of claim 1, the current content comprising a first video, and a content recommendation comprising a second video contextually relevant to the first video.

8. The method of claim 1, the current content associated with a first language, and a content recommendation associated with a second language.

9. The method of claim 1, the current content associated with a non-English language, and a content recommendation associated with the non-English language.

10. The method of claim 1, the filtering comprising:
utilizing a diffusion wavelet tree construction technique to identify the set of refined topic groupings.

11. The method of claim 10, the utilizing a diffusion wavelet tree construction technique comprising:
removing one or more global supportive terms from the topic grouping; and
retaining one or more local supportive terms within the topic grouping.

12. The method of claim 1, the filtering the set of topic groupings comprising:
iteratively removing one or more terms from the topic grouping based upon the topic contribution threshold.

13. The method of claim 1, the minimum entropy curve corresponding to the set of topic groupings and the uniform probability distribution entropy curve corresponding to the set of topic groupings.

14. The method of claim 1, the removing a third term comprising:
reducing the entropy based upon a removed term.

15. A system for providing content recommendations, comprising:
a graph generation component configured to:
generate a graph based upon terms extracted from a content corpus;
identify a set of topic groupings within the graph, a topic grouping comprising one or more terms that contribute to a topic of the topic grouping; and
filter the set of topic groupings based upon a topic contribution threshold, specifying a threshold amount of contribution a term is to provide to an associated topic, to identify a set of refined topic groupings within the graph, the filtering comprising:
removing a first term from the topic grouping responsive to:
determining that the first term provides a first amount of contribution to the topic, wherein the first amount of contribution corresponds to a first amount of semantic relevance of the first term to the topic; and
determining that the first amount of contribution is less than the threshold amount of contribution, wherein the threshold amount of contribution corresponds to a threshold amount of semantic relevance;
assigning weights to respective terms within the topic grouping;
normalizing the weights to define a probability mass function;
computing an entropy of the probability mass function; and
responsive to the entropy having a value that is not between a minimum entropy curve and a uniform probability distribution entropy curve, removing a second term from the topic grouping based upon the topic contribution threshold; and
a content recommendation component configured to:
identify metadata of current content consumed by a user;
evaluate the set of refined topic groupings from the graph based upon the metadata to identify a set of relevant nodes; and
provide one or more content recommendations based upon content associated with the set of relevant nodes.

16. The system of claim 15, the graph generation component configured to:
iteratively remove one or more terms from the topic grouping based upon the topic contribution threshold.

17. The system of claim 15, the minimum entropy curve corresponding to the set of topic groupings and the uniform probability distribution entropy curve corresponding to the set of topic groupings.

18. The system of claim 15, the graph generation component configured to:
utilize a diffusion wavelet tree construction technique to identify the set of refined topic groupings.

19. The system of claim 18, the graph generation component configured to:
utilize the diffusion wavelet tree construction technique to:
remove one or more global supportive terms from the topic grouping; and
retain one or more local supportive terms within the topic grouping.

20. A nontransitory memory device storing instructions that, when executed on a processor of a server, cause the server to provide content recommendations, by:
decomposing a graph, comprising one or more terms extracted from a content corpus, into a set of topic groupings, a topic grouping comprising one or more terms that contribute to a topic of the topic grouping;
filtering the set of topic groupings based upon a topic contribution threshold, specifying a threshold amount of contribution a term is to provide to an associated topic, to identify a set of refined topic groupings from the graph, the filtering comprising:

assigning weights to respective terms within the topic grouping;

normalizing the weights to define a probability mass function;

computing an entropy of the probability mass function; and responsive to the entropy having a value that is not between a minimum entropy curve and a uniform probability distribution entropy curve, removing a second term from the topic grouping based upon the topic contribution threshold;

identifying metadata of a current content consumed by a user;

evaluating the set of refined topic groupings within the graph based upon the metadata to identify a set of relevant nodes; and providing one or more content recommendations based upon content associated with the set of relevant nodes.

* * * * *